US012774690B2

(12) United States Patent
Tsudome et al.

(10) Patent No.: US 12,774,690 B2
(45) Date of Patent: Oct. 27, 2026

(54) CONTROL CIRCUITRY OF INTERNAL COMBUSTION ENGINE AND MOTORCYCLE

(71) Applicant: KAWASAKI MOTORS, LTD., Akashi (JP)

(72) Inventors: Yu Tsudome, Akashi (JP); Toshiyuki Moritake, Akashi (JP)

(73) Assignee: KAWASAKI MOTORS LTD., Hyogo (JP)

( * ) Notice: Subject to any disclaimer, the term of this patent is extended or adjusted under 35 U.S.C. 154(b) by 22 days.

(21) Appl. No.: 19/085,241

(22) Filed: Mar. 20, 2025

(65) Prior Publication Data

US 2025/0297583 A1 Sep. 25, 2025

(30) Foreign Application Priority Data

Mar. 21, 2024 (JP) ................................ 2024-045389

(51) Int. Cl.
*F02D 41/14* (2006.01)

(52) U.S. Cl.
CPC ..... *F02D 41/1475* (2013.01); *F02D 41/1454* (2013.01); *F02D 2200/502* (2013.01)

(58) Field of Classification Search
CPC ......................... F02D 41/1454; F02D 41/1475
See application file for complete search history.

(56) References Cited

U.S. PATENT DOCUMENTS

| | | | | |
|---|---|---|---|---|
| 7,047,742 | B2 * | 5/2006 | Kono | F02M 26/02 60/605.1 |
| 7,131,266 | B2 * | 11/2006 | Kita | F01N 3/2006 60/287 |
| 11,085,385 | B2 * | 8/2021 | Ulrey | F02D 41/1475 |
| 2002/0083915 | A1 * | 7/2002 | Choi | F01M 1/20 123/196 AB |
| 2002/0112467 | A1 * | 8/2002 | Uranishi | F01N 11/007 60/277 |
| 2012/0166068 | A1 | 6/2012 | Kuratani et al. | |

FOREIGN PATENT DOCUMENTS

| | | |
|---|---|---|
| JP | 2012136970 A | 7/2012 |

* cited by examiner

*Primary Examiner* — Kevin A Lathers
(74) *Attorney, Agent, or Firm* — Wenderoth, Lind & Ponack, L.L.P.

(57) ABSTRACT

Control circuitry of an internal combustion engine, that is, an ICE of a vehicle is configured to: determine whether or not a first condition is satisfied, the first condition being a condition that the ICE is in an idling state; determine whether or not a second condition is satisfied, the second condition being a condition that air which has bypassed the ICE is supplied to an exhaust passage of the ICE; acquire air-fuel ratio information regarding an air-fuel ratio detected by an air-fuel ratio sensor from an exhaust gas of the ICE; and as a result of determining that the first condition and the second condition are satisfied, execute first feedback control in which an amount of fuel supplied to the ICE is increased or decreased based on the air-fuel ratio information in response to an increase or decrease of the air-fuel ratio.

9 Claims, 5 Drawing Sheets

CONTROL CIRCUITRY OF INTERNAL COMBUSTION ENGINE AND MOTORCYCLE

CROSS REFERENCE TO RELATED APPLICATIONS

This application claims priority to and the benefit of Japanese Patent Application No. 2024-45389 filed on Mar. 21, 2024, the entire disclosure of which is incorporated herein by reference.

BACKGROUND ART

Field of the Invention

The present disclosure relates to control circuitry of an internal combustion engine and a motorcycle.

Description of the Related Art

Japanese Laid-Open Patent Application Publication No. 2012-136970 discloses an internal combustion engine in which secondary air is supplied to an exhaust port in an operation state in an idling operation range. In the idling operation range, a control device for the internal combustion engine controls an injection amount of fuel such that an air-fuel ratio of an exhaust gas after receiving the supply of the secondary air becomes a “lean” state.

To set the air-fuel ratio of the exhaust gas after receiving the supply of the secondary air to the lean state, the flow rate of the secondary air needs to be increased. Since the flow rate of the secondary air is unstable, the state of the exhaust gas and the behavior of the internal combustion engine may become unstable.

SUMMARY OF THE INVENTION

One aspect of the present disclosure is to provide control circuitry of an internal combustion engine which stabilizes the state of an exhaust gas.

Control circuitry according to one aspect of the present disclosure is control circuitry of an internal combustion engine of a vehicle, the control circuitry being configured to: determine whether or not a first condition is satisfied, the first condition being a condition that the internal combustion engine is in an idling state; determine whether or not a second condition is satisfied, the second condition being a condition that the internal combustion engine is in a state where air which has bypassed the internal combustion engine is supplied to an exhaust passage of the internal combustion engine; acquire air-fuel ratio information that is information regarding an air-fuel ratio detected by an air-fuel ratio sensor from an exhaust gas of the internal combustion engine; and as a result of determining that the first condition and the second condition are satisfied, execute first feedback control in which an amount of fuel supplied to the internal combustion engine is increased or decreased based on the air-fuel ratio information in response to an increase or decrease of the air-fuel ratio.

DETAILED DESCRIPTION

Hereinafter, an exemplary embodiment of the present disclosure will be described with reference to the drawings. The embodiment described below is a comprehensive or specific example. Among components in the following embodiment, components that are not recited in independent claims which embody the broadest concept of the present disclosure will be described as optional components. The diagrams in the attached drawings are schematic diagrams and are not necessarily strictly drawn. In the diagrams, the same reference signs are used for the substantially identical components, and the repetition of the same explanation may be avoided, or such explanation may be simplified.

Figure 1:
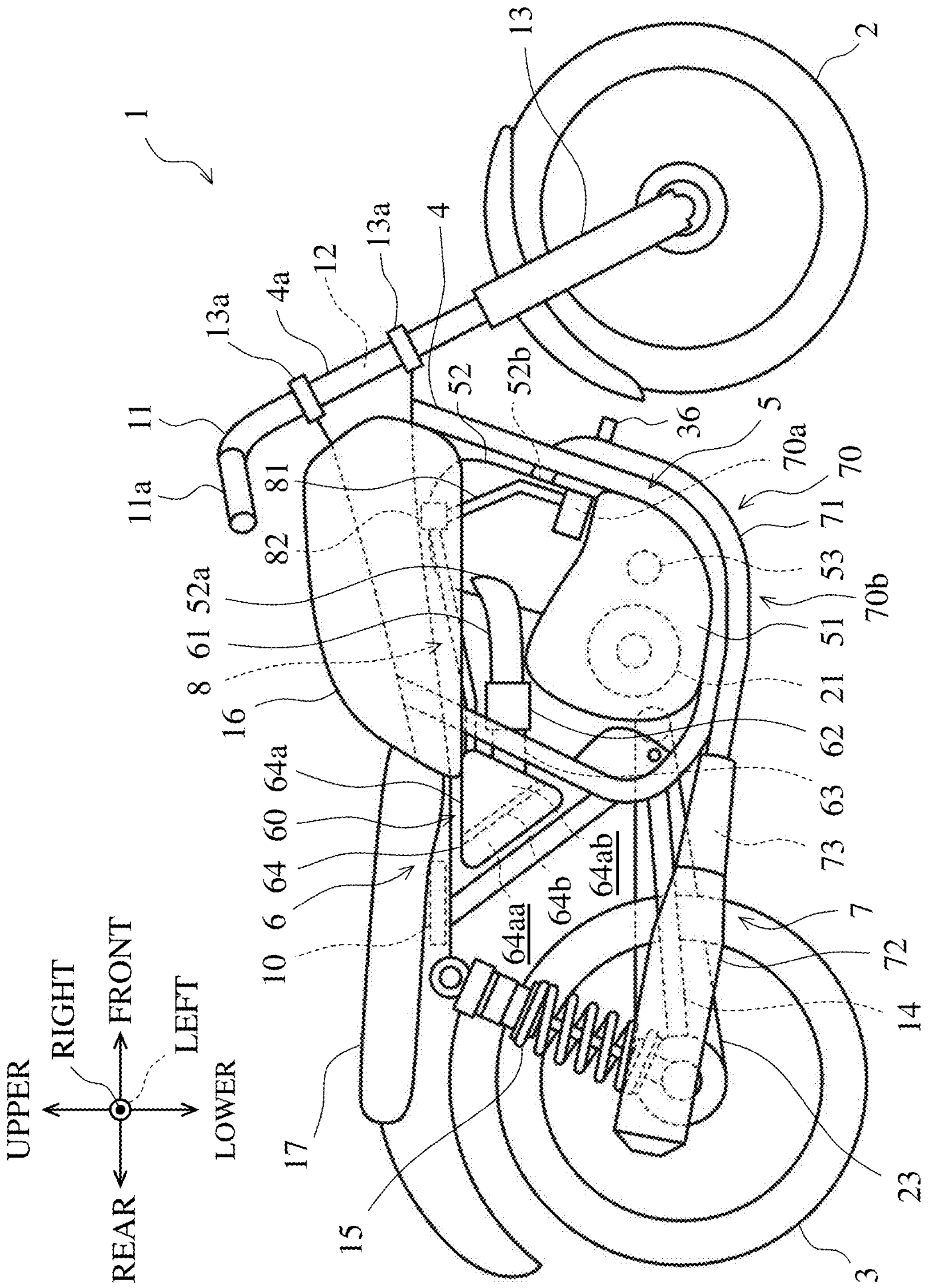
FIG. 1 is a side view showing one example of the configuration of a vehicle according to an exemplary embodiment.

A vehicle 1 according to an exemplary embodiment will be described with reference to FIG. 1. FIG. 1 is a side view showing one example of the configuration of the vehicle 1 according to the exemplary embodiment. The vehicle 1 is a movable body that can move with one or more persons on the vehicle 1. The vehicle 1 may include an internal combustion engine. Examples of the vehicle 1 may include an automobile and a motorcycle. For example, the automobile may include three or more wheels that move the automobile. The motorcycle may include three or less wheels that move the motorcycle. Examples of the motorcycle include a straddled vehicle straddled by a person and a scooter vehicle including a floorboard in front of a seat. Examples of the automobile may include a motor three-wheeler or a buggy car.

Hereinafter, a straddled motorcycle will be described as one example of the vehicle 1. Therefore, the “vehicle 1” may be referred to as the “motorcycle 1.”

Herein, in the present specification and the claims, an upper direction, upward, a lower direction, downward, a front direction, forward, a rear direction, rearward, a left direction, leftward, a right direction, rightward, a lateral direction, and lateral indicate directions based on the motorcycle 1 located on a horizontal surface. The upper direction and upward indicate a direction from the horizontal surface toward the motorcycle 1. The lower direction and downward indicate a direction from the motorcycle 1 toward the horizontal surface. The front direction and forward indicate an advancing direction of the motorcycle 1. The rear direction, rearward, the left direction, leftward, the right direction, rightward, the lateral direction, and lateral indicate directions with respect to the front direction or forward.

The motorcycle 1 includes a front wheel 2, a rear wheel 3, a vehicle body frame 4, an internal combustion engine 5, an intake structure 6, an exhaust structure 7, a secondary air supply structure 8, and an electronic control unit 10. Hereinafter, the "electronic control unit 10" may be referred to as an "ECU 10." The "internal combustion engine" may be referred as the "ICE".

The motorcycle 1 further includes a handlebar 11, a steering shaft 12, a pair of front forks 13 that are left and right front forks 13, a swing arm 14, a rear suspension 15, a fuel tank 16, and a seat 17. Upper portions of the front forks 13 are coupled to a pair of brackets 13*a* located at an interval in an upper-lower direction, and lower portions of the front forks 13 support the front wheel 2 such that the front wheel 2 is rotatable. The brackets 13*a* are connected to the steering shaft 12 supporting the handlebar 11. The steering shaft 12 is angularly displaceably supported by a head pipe 4*a* that is part of the vehicle body frame 4.

The swing arm 14 supports the rear wheel 3, extends in a front-rear direction, and is pivotally supported by the vehicle body frame 4. The rear suspension 15 is connected to the swing arm 14 and the vehicle body frame 4.

The fuel tank 16 is located behind the handlebar 11, and the seat 17 on which a rider is seated is located behind the fuel tank 16.

The internal combustion engine 5 is located between the front wheel 2 and the rear wheel 3, is located in a space surrounded by the vehicle body frame 4, and is fixed to portions of the vehicle body frame 4. The internal combustion engine 5 includes a crankcase 51 and a cylinder block 52 extending upward from an upper portion of the crankcase 51. The cylinder block 52 includes an intake port 52*a* and an exhaust port 52*b*. In the present embodiment, the intake port 52*a* is located at a rear portion of the cylinder block 52, and the exhaust port 52*b* is located at a front portion of the cylinder block 52. However, the positions of the intake port 52*a* and the exhaust port 52*b* are not limited to these.

The exhaust port 52*b* is connected to the exhaust structure 7. The exhaust structure 7 includes: an exhaust pipe 71 including an upstream end connected to the exhaust port 52*b*; a silencer 72 connected to a downstream end of the exhaust pipe 71; and a catalyst 73. In the present embodiment, the catalyst 73 is located at the silencer 72 but may be located at the exhaust pipe 71. The catalyst 73 has an ability to promote an oxidation reaction of an exhaust gas to purify the exhaust gas.

The intake port 52*a* is connected to the intake structure 6. The intake structure 6 includes: an intake pipe 61 extending rearward from the intake port 52*a*; throttle equipment 62 connected to the intake pipe 61; an intake duct 63 connected to a rear portion of the throttle equipment 62; and an air cleaner 64 connected to a rear portion of the intake duct 63. The intake pipe 61, the intake duct 63, and the air cleaner 64 form an intake passage 60 through which outside air that is air is introduced to the internal combustion engine 5. The operation of the throttle equipment 62 is controlled by the ECU 10.

The air cleaner 64 includes an air cleaner case 64*a* and a filter 64*b* that is accommodated in the air cleaner case 64*a* and purifies the outside air supplied from an outside. The filter 64*b* divides an internal space of the air cleaner case 64*a* into a dirty space 64*aa* and a clean space 64*ab*. The outside air flows into the dirty space 64*aa* through an opening of the air cleaner case 64*a*. Clean air which has passed through the filter 64*b* flows into the clean space 64*ab*. The clean space 64*ab* communicates with the intake duct 63.

Figure 2:
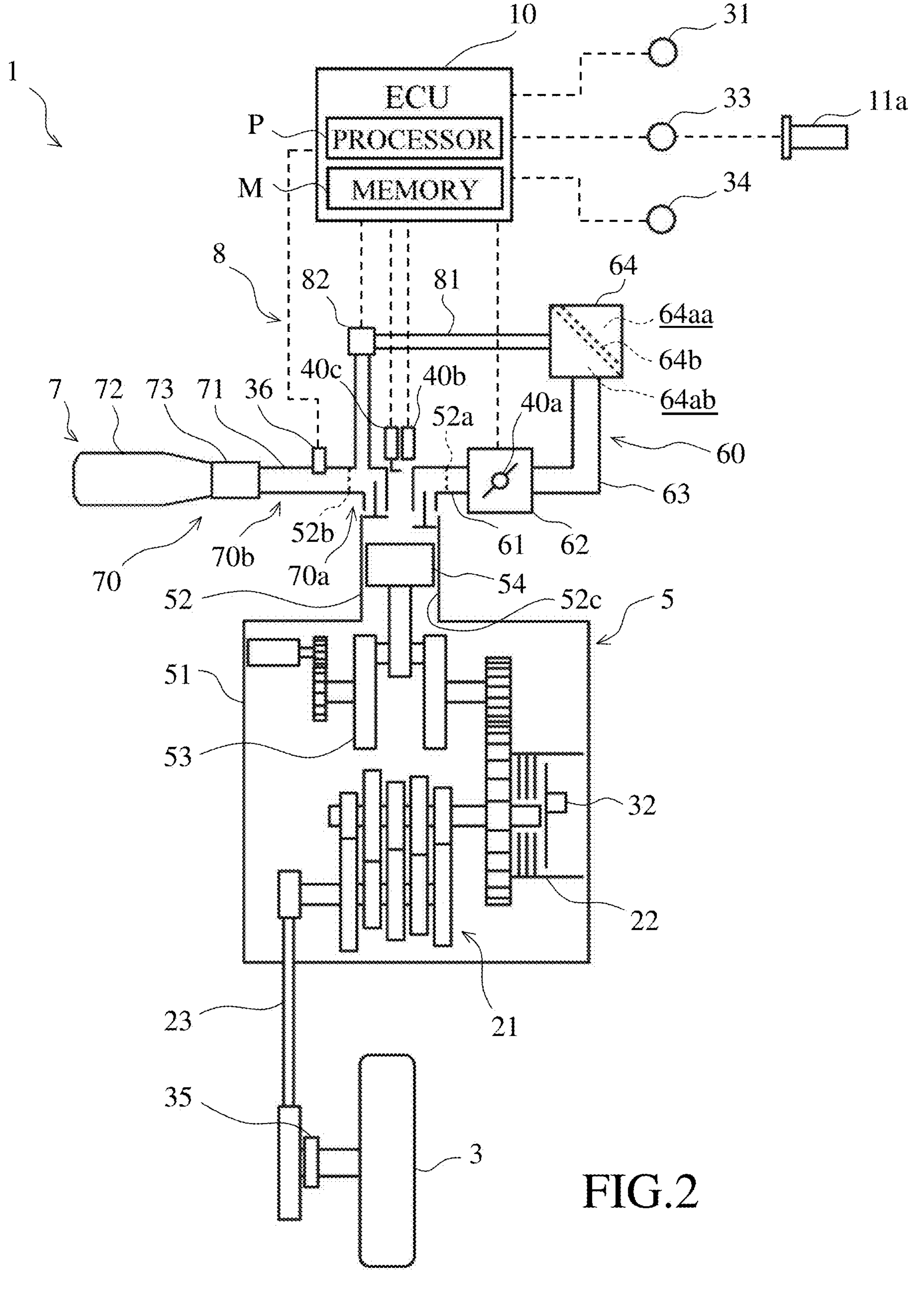
FIG. 2 is a schematic diagram showing one example of a power system of a motorcycle 1 of FIG. 1.

FIG. 2 is a schematic diagram showing one example of a power system of the motorcycle 1 of FIG. 1. As shown in FIGS. 1 and 2, the air cleaner case 64*a* is also connected to the secondary air supply structure 8. The secondary air supply structure 8 includes a secondary air pipe 81 and a secondary air control valve 82. One of ends of the secondary air pipe 81 is connected to the air cleaner case 64*a* and communicates with the clean space 64*ab*. The other end of the secondary air pipe 81 is connected to an exhaust passage 70. The secondary air pipe 81 forms a supply passage that bypasses the internal combustion engine 5 and connects the intake passage 60 and the exhaust passage 70 with each other. The secondary air control valve 82 is located at a portion of the secondary air pipe 81 and opens and closes a passage in the secondary air pipe 81. The secondary air control valve 82 is an electromagnetic valve as one example, and opening and closing operations of the secondary air control valve 82 are controlled by the ECU 10.

The exhaust passage 70 is a passage through which the exhaust gas from the internal combustion engine 5 is guided toward the outside. The exhaust passage 70 includes: an inside-engine passage 70*a* in the cylinder block 52; and an outside-engine passage 70*b* including the exhaust pipe 71 and the silencer 72. The inside-engine passage 70*a* is a passage through which the exhaust gas in a cylinder 52*c* included in the cylinder block 52 flows to the outside of the cylinder block 52. The inside-engine passage 70*a* includes the exhaust port 52*b*. In the present embodiment, the secondary air pipe 81 is connected to the cylinder block 52 and communicates with the inside-engine passage 70*a* at a position closer to the cylinder 52*c* than the exhaust port 52*b*. However, the secondary air pipe 81 is not limited to this configuration. For example, the secondary air pipe 81 may be connected to the exhaust pipe 71 so as to communicate with the outside-engine passage 70*b*. The secondary air pipe 81 may be connected to the exhaust passage 70 at such a position that fuel and carbon monoxide uncombusted in the cylinder 52*c* can be recombusted by the outside air supplied through the secondary air pipe 81.

The secondary air supply structure 8 is a structure for supplying secondary air, which is air having flowed through the air cleaner 64, to the exhaust passage 70 through which the exhaust gas generated by the internal combustion engine 5 flows. In the present embodiment, the secondary air supply structure 8 has such a suction structure that the secondary air is sucked into the exhaust passage 70 by negative pressure generated in the exhaust passage 70 during the operation of the internal combustion engine 5. However, the secondary air supply structure 8 is not limited to this structure.

Since the negative pressure generated in the exhaust passage 70 is not stable, the flow rate of the secondary air supplied by the secondary air supply structure 8 is not stable, either. For example, even when the secondary air is supplied to the exhaust passage 70 by the secondary air supply structure 8 in a case where the internal combustion engine 5 is idling during warming-up, the secondary air may not be able to adequately recombust the uncombusted fuel and carbon monoxide contained in the exhaust gas. On the other hand, when an air-fuel ratio is caused to be excessively lean to reduce the concentrations of the uncombusted fuel and the carbon monoxide, the internal combustion engine 5 may stop or stall. As will be described later, the ECU 10 according to the present embodiment executes air-fuel ratio feedback control during the supply of the secondary air to prevent the occurrence of the above state of the internal combustion engine 5.

The motorcycle 1 further includes a transmission 21 and a clutch 22 in the crankcase 51. The internal combustion engine 5 includes: a crankshaft 53 in the crankcase 51; and one or more pistons 54 that are slidably located in one or more cylinders 52*c* of the cylinder block 52 and connected to the crankshaft 53 so as to be able to transmit driving power to the crankshaft 53.

The internal combustion engine 5 generates the power by repeating combustion and explosion of a fuel-air mixture of the fuel and the air in the cylinder 52*c*. The internal combustion engine 5 converts the reciprocation of the piston 54, reciprocated by the combustion and explosion, into the rotational movement of the crankshaft 53 and transmits the rotational power of the crankshaft 53 to the rear wheel 3 that is a driving wheel. One of ends of the crankshaft 53 is connected to the clutch 22 and is further connected to an input shaft of the transmission 21 through the clutch 22 so as to be able to transmit the power to the input shaft. An output shaft of the transmission 21 transmits the rotational power of the crankshaft 53 to the rear wheel 3 through a power transmitting structure 23, such as a chain or a belt.

The internal combustion engine 5 may be a four-stroke cycle engine or a two-stroke cycle engine. The fuel used by the internal combustion engine 5 may be any fuel, such as fuel containing a hydrocarbon compound, fuel derived from an animal or a plant, or fuel of non-carbide. Examples of the fuel containing the hydrocarbon compound include gasoline, ethanol, propane gas, and methane. One example of the fuel derived from an animal or a plant is biofuel. One example of the fuel of non-carbide is hydrogen. The number of cylinders 52*c* of the internal combustion engine 5 may be one or plural.

The transmission 21 includes gears and can change a reduction ratio by changing the gears by which the power of the internal combustion engine 5 is transmitted to the rear wheel 3. The transmission 21 may include a structure that changes the reduction ratio by a movable manipulation element, such as a shift pedal, mechanically connected to the transmission 21. The transmission 21 may include an actuator that changes the reduction ratio by the control of the ECU 10. The clutch 22 includes a structure that establishes or cuts power transmission between the crankshaft 53 and the transmission 21. The clutch 22 may include a structure that performs the establishing and cutting operations by a movable manipulation element, such as a clutch lever, mechanically connected to the clutch 22. The clutch 22 may include an actuator that causes the clutch 22 to perform the establishing and cutting operations by the control of the ECU 10.

The motorcycle 1 may include a gear position sensor 31. The gear position sensor 31 detects a command that specifies the reduction ratio of the transmission 21 and outputs the detection signal to the ECU 10. For example, the gear position sensor 31 detects an operation with respect to a manipulation element, such as the shift pedal, a shift lever, or a shift button. In accordance with the detection signal of the gear position sensor 31, the ECU 10 may cause the actuator of the transmission 21 to change the gears which transmit the power of the internal combustion engine 5 to the rear wheel 3.

The motorcycle 1 may include a clutch sensor 32. The clutch sensor 32 detects whether the clutch 22 is in an engaged state or a disengaged state, and outputs the detection signal to the ECU 10. The ECU 10 may cause the actuator of the clutch 22 to drive the clutch 22 based on the detection signal of the clutch sensor 32.

The motorcycle 1 may include a throttle position sensor 33 that detects an operation position of a throttle grip 11*a* located at the handlebar 11. The throttle position sensor 33 outputs the detection signal to the ECU 10. The detection signal of the operation position of the throttle grip 11*a* is a signal that specifies an opening degree of a throttle valve of the throttle equipment 62. The ECU 10 causes a throttle actuator 40*a* of the throttle equipment 62 to drive the throttle valve in accordance with the detection signal of the throttle position sensor 33.

The motorcycle 1 may include a temperature sensor 34 that detects a temperature state of the internal combustion engine 5. One or more temperature sensors 34 may be located so as to detect the temperature of cooling water that cools the internal combustion engine 5, the temperature of lubricating oil that lubricates the inside of the internal combustion engine 5, or both of these temperatures. The temperature sensor 34 may be located at a passage of the cooling water or a passage of the lubricating oil. The temperature sensor 34 outputs the detection signal to the ECU 10.

The motorcycle 1 includes a vehicle speed sensor 35 at the rear wheel 3. The vehicle speed sensor 35 detects the rotational frequency of the rear wheel 3 and outputs the detection signal to the ECU 10. The vehicle speed sensor 35 or the ECU 10 detects the vehicle speed of the motorcycle 1 from the rotational frequency of the rear wheel 3. Examples of the vehicle speed sensor 35 may include rotation sensors, such as an encoder. The vehicle speed sensor 35 may be located at the front wheel 2 and detect the rotational frequency of the front wheel 2. The vehicle speed sensor 35 may be realized by Global Navigation Satellite System (GNSS) that detects the position of the motorcycle 1 on the earth.

The motorcycle 1 includes an air-fuel ratio sensor 36. The air-fuel ratio sensor 36 detects air-fuel ratio information that is information regarding the air-fuel ratio, which is detected from the exhaust gas of the internal combustion engine 5. The air-fuel ratio is a dimensionless quantity obtained by dividing the mass of the air by the mass of the fuel at the time of the combustion and explosion in the internal combustion engine 5. For example, a theoretical air-fuel ratio is 14.7.

In the present embodiment, the air-fuel ratio sensor 36 is an $O_2$ sensor and is located at the exhaust passage 70. However, the air-fuel ratio sensor 36 is not limited to this. The $O_2$ sensor may be located at a portion of the exhaust passage 70. This portion of the exhaust passage 70 may be located downstream of a connection portion, at which the exhaust passage 70 and the secondary air pipe 81 are connected to each other, in the flow direction of the exhaust gas. For example, the $O_2$ sensor is located between the exhaust port 52*b* and the catalyst 73. As the air-fuel ratio information, the $O_2$ sensor detects the presence or absence of oxygen contained in the exhaust gas flowing through the exhaust passage 70 and outputs a signal indicating the detection result to the ECU 10. The $O_2$ sensor outputs a voltage signal as the detection result. When the concentration of the oxygen in the exhaust gas is low, the $O_2$ sensor outputs the voltage signal of a high voltage value, for example, close to a reference voltage value. This voltage signal indicates that the air-fuel ratio is lower than the theoretical air-fuel ratio and is in a rich state. When the concentration of the oxygen in the exhaust gas is high, the $O_2$ sensor outputs the voltage signal of a low voltage value, for example, close to zero. This voltage signal indicates that the air-fuel ratio is higher than the theoretical air-fuel ratio and is in a lean state.

The air-fuel ratio sensor 36 may be a wide range air-fuel ratio sensor that detects the concentration of the oxygen contained in the exhaust gas. Examples of the wide range air-fuel ratio sensor include an A/F (Air by Fuel Ratio) sensor and a LAF (Linear Air-Fuel Ratio) sensor. According to the wide range air-fuel ratio sensor, a current value flowing in the wide range air-fuel ratio sensor corresponds to the concentration of the oxygen contained in the exhaust gas. The wide range air-fuel ratio sensor outputs a signal indicating the current value corresponding to the concentration of the oxygen. For example, the ECU 10 can detect a deviation amount of the air-fuel ratio with respect to the theoretical air-fuel ratio based on the detection signal of the wide range air-fuel ratio sensor.

The air-fuel ratio sensor 36 may include a heater that increases the temperature of the air-fuel ratio sensor 36 by receiving the supply of the electric power. Thus, damages of the air-fuel ratio sensor 36 by the heat of the exhaust gas are prevented. In addition to the $O_2$ sensor, the motorcycle 1 may include, as the air-fuel ratio sensor 36, a wide range air-fuel ratio sensor or an $O_2$ sensor located at the exhaust passage 70 extending between the catalyst 73 and the silencer 72. The ECU 10 uses the detection result of the $O_2$ sensor, the detection result of the wide range air-fuel ratio sensor, or both of these detection results as feedback information to control the injection amount of fuel supplied to the internal combustion engine 5 such that the air-fuel ratio approaches the theoretical air-fuel ratio, and impurities in the exhaust gas located downstream of the catalyst 73 are reduced.

The motorcycle 1 includes one or more internal combustion engine actuators that control the driving of the internal combustion engine 5. The one or more internal combustion engine actuators include at least the throttle actuator 40*a*, a fuel injection actuator 40*b*, and an ignition actuator 40*c*. The throttle actuator 40*a* drives the throttle valve that adjusts the flow rate of the air flowing into the cylinder block 52. The fuel injection actuator 40*b* includes a fuel injector that injects the fuel into the cylinder block 52. The ignition actuator 40*c* includes an ignition plug that ignites the fuel-air mixture of the air and the fuel in the cylinder block 52.

The ECU 10 adjusts torque, which is output from the internal combustion engine 5, in accordance with the detection signals of sensors which are included in the motorcycle 1 and detect vehicle states. For example, the ECU 10 controls the operations of the throttle actuator 40*a*, the fuel injection actuator 40*b*, and the ignition actuator 40*c* so as to obtain the torque according to the rotational frequency of the crankshaft 53, the vehicle speed, and the throttle opening degree.

The ECU 10 controls various actuators and the like in accordance with the detection signals of the sensors which are included in the motorcycle 1 and detect the vehicle states. The ECU 10 includes control circuitry. The ECU 10 may include a microcomputer including a processor P, such as a CPU (Central Processing Unit) or a DSP (Digital Signal Processor), and a memory M. The ECU 10 may include a clock that measures time. Examples of the memory M include: a volatile memory, such as a RAM (Random Access Memory); and a non-volatile memory, such as a ROM (Read-Only Memory). Some or all of the functions of the ECU 10 may be realized in such a manner that the CPU uses the RAM as a work memory and executes a program recorded in the ROM. Some or all of the functions of the ECU 10 may be realized by dedicated hardware circuitry, such as electronic circuitry or integrated circuitry. Some or all of the functions of the ECU 10 may be realized by the combination of the above software function and the hardware circuitry. Communication between the ECU 10 and devices mounted on the motorcycle 1 may be communication through an in-vehicle network, such as a CAN (Controller Area Network).

The ECU 10 uses the air-fuel ratio information, detected by the air-fuel ratio sensor 36, as the feedback information to execute feedback control of controlling the injection amount of fuel by the fuel injection actuator 40*b*. In the feedback control, the ECU 10 increases or decreases the injection amount of fuel injected to the internal combustion engine 5 based on the air-fuel ratio information in response to the increase or decrease of the air-fuel ratio. In the present embodiment, since the air-fuel ratio sensor 36 is the $O_2$ sensor, the ECU 10 performs $O_2$ feedback control.

As the feedback control, the ECU 10 executes first feedback control and second feedback control. The first feedback control is control corresponding to a state where the secondary air supply structure 8 is supplying the secondary air to the exhaust passage 70, and the second feedback control is control corresponding to a state where the secondary air supply structure 8 is not supplying the secondary air to the exhaust passage 70.

The ECU 10 determines whether or not a first feedback execution condition is satisfied. The ECU 10 determines the execution of the first feedback control when the first feedback execution condition is satisfied, i.e., in response to determining that the first feedback execution condition is satisfied. The ECU 10 determines whether or not a second feedback execution condition is satisfied. The ECU 10 determines the execution of the second feedback control when the second feedback execution condition is satisfied, i.e., in response to determining that the second feedback execution condition is satisfied.

The first feedback execution condition includes one or more of first to sixth execution conditions. In the present embodiment, the first feedback execution condition includes all of the first to sixth execution conditions. The first execution condition relates to an operating state of the air-fuel ratio sensor 36. Specifically, the first execution condition is a condition that the air-fuel ratio sensor 36 is in an active state. The second execution condition relates to the state of the transmission 21. Specifically, the second execution condition is a condition that the transmission 21 is in a neutral gear state in which the gears of the transmission 21 are not connected to the internal combustion engine 5 so as to transmit the driving power of the internal combustion engine 5. The third execution condition relates to the abnormality of the air-fuel ratio sensor 36. Specifically, the third execution condition is a condition that the determination of failure diagnosis of the air-fuel ratio sensor 36 is not established. The fourth execution condition relates to the abnormality of the heater of the air-fuel ratio sensor 36. Specifically, the fourth execution condition is a condition that the determination of failure diagnosis of the heater of the air-fuel ratio sensor 36 is not established. The fifth execution condition relates to the abnormality of the secondary air control valve 82. Specifically, the fifth execution condition is a condition that the determination of failure diagnosis of the secondary air control valve 82 is not established. The sixth execution condition relates to a control state of the ECU 10. Specifically, the sixth execution condition is a condition that the second feedback control is not being executed. The first to sixth execution conditions contribute to a second condition. The second execution condition corresponds to a third condition, and the sixth execution condition corresponds to a fourth condition.

The first feedback execution condition may further include a seventh execution condition that relates to the operating state of the internal combustion engine 5. In the present embodiment, the first feedback execution condition includes the seventh execution condition. Specifically, the seventh execution condition is a condition that the internal combustion engine 5 is in the idling state. The idling state is a state where the ECU 10 causes the internal combustion engine 5 to operate at a predetermined rotational frequency in a state where a signal that commands the open of the throttle valve is not output from the throttle position sensor 33. The seventh execution condition corresponds to a first condition.

The first feedback execution condition may further include an eighth execution condition that relates to the operating state of the secondary air control valve 82. Specifically, the eighth execution condition is a condition that the secondary air control valve 82 is in an open state in which the exhaust passage 70 is open. The open state is a state where the air which has bypassed the internal combustion engine 5 is supplied to the exhaust passage 70. The eighth execution condition corresponds to the second condition.

The first feedback execution condition may further include a ninth execution condition that relates to the temperature of the internal combustion engine 5. Specifically, the ninth execution condition is a condition that the temperature detected by the temperature sensor 34 is a predetermined temperature or less. The predetermined temperature may be a temperature at which the internal combustion engine 5 changes from a warming-up state to a normal operation state. That the ninth execution condition is satisfied may denote that the internal combustion engine 5 is in the warming-up state.

The first feedback execution condition may further include a tenth execution condition that relates to the vehicle speed of the motorcycle 1. Specifically, the tenth execution condition is a condition that the vehicle speed of the motorcycle 1 which is detected by the vehicle speed sensor 35 is "zero."

The first feedback execution condition may further include an eleventh execution condition that relates to the state of the clutch 22. Specifically, the eleventh execution condition is a condition that the state of the clutch 22 which is detected by the clutch sensor 32 is the disengaged state in which the power transmission is cut.

That the first feedback execution condition is satisfied denotes that all of the execution conditions included in the first feedback execution condition are satisfied. When at least one of the execution conditions included in the first feedback execution condition is not satisfied, the first feedback execution condition is not satisfied.

In response to the ECU 10 determining during the execution of the first feedback control that a stop condition of the first feedback control is satisfied, the ECU 10 may stop the first feedback control. The stop condition of the first feedback control may include a condition that at least one of the execution conditions included in the first feedback execution condition is not satisfied. The stop condition of the first feedback control may include a condition that the seventh execution condition that relates to the idling state of the internal combustion engine 5 is not satisfied. That the stop condition of the first feedback control is satisfied may denote that one or more of the conditions included in the stop condition of the first feedback control are satisfied.

The second feedback execution condition includes one or more of the first, third, fourth, and fifth execution conditions. The second feedback execution condition may further include a twelfth execution condition that relates to the first feedback execution condition. Specifically, the twelfth execution condition is a condition that the first feedback execution condition is not satisfied. In the present embodiment, the second feedback execution condition includes all of the first, third, fourth, fifth, and twelfth execution conditions. However, the second feedback execution condition is not limited to this.

The second feedback execution condition may further include a thirteenth execution condition that relates to the temperature of the internal combustion engine 5. Specifically, the thirteenth execution condition is a condition that the temperature detected by the temperature sensor 34 is higher than a predetermined temperature. The predetermined temperature may be a temperature at which the internal combustion engine 5 changes from the warming-up state to the normal operation state. That the thirteenth execution condition is satisfied may denote that the internal combustion engine 5 is in the normal operation state.

That the second feedback execution condition is satisfied denotes that all of the execution conditions included in the second feedback execution condition are satisfied. When at least one of the execution conditions included in the second feedback execution condition is not satisfied, the second feedback execution condition is not satisfied.

In response to the ECU 10 determining during the execution of the second feedback control that a stop condition of the second feedback control is satisfied, the ECU 10 may stop the second feedback control. The stop condition of the second feedback control may include a condition that at least one of the execution conditions included in the second feedback execution condition is not satisfied. The stop condition of the second feedback control may include a condition that the seventh execution condition that relates to the idling state of the internal combustion engine 5 is satisfied. In other words, the stop condition of the second feedback control may include a condition that the operation position of the throttle grip 11*a* which is detected by the throttle position sensor 33 indicates a fully closed state of the throttle valve. That the stop condition of the second feedback control is satisfied may denote that one or more of the conditions included in the stop condition of the second feedback control are satisfied.

The ECU 10 controls the operation of the secondary air control valve 82. The ECU 10 determines whether or not an open drive condition is satisfied. In response to the ECU 10 determining that the open drive condition is satisfied, the ECU 10 causes the secondary air control valve 82 to perform the opening operation to open the exhaust passage 70. The ECU 10 determines whether or not a close drive condition is satisfied. In response to the ECU 10 determining that the close drive condition is satisfied, the ECU 10 causes the secondary air control valve 82 to perform the closing operation to close the exhaust passage 70.

The open drive condition includes a condition that the first feedback execution condition is satisfied. The open drive condition may include a condition that at least the first to sixth execution conditions of the first feedback execution condition are satisfied. The open drive condition may further include a condition that the seventh execution condition that the internal combustion engine 5 is in the idling state is satisfied. That the open drive condition is satisfied denotes that all of the execution conditions regarding the open drive condition are satisfied.

The close drive condition includes a condition that the second feedback execution condition is satisfied. The close drive condition may include a condition that at least the first, third, fourth, and fifth execution conditions of the second feedback execution condition are satisfied. The close drive condition may further include a condition that the twelfth execution condition that the first feedback execution condition is not satisfied is satisfied. The close drive condition may further include a condition that a fourteenth execution condition that relates to the control state of the ECU 10 is satisfied. Specifically, the fourteenth execution condition is a condition that the second feedback control is being executed. That the close drive condition is satisfied denotes that all of the execution conditions regarding the close drive condition are satisfied.

Figure 3:
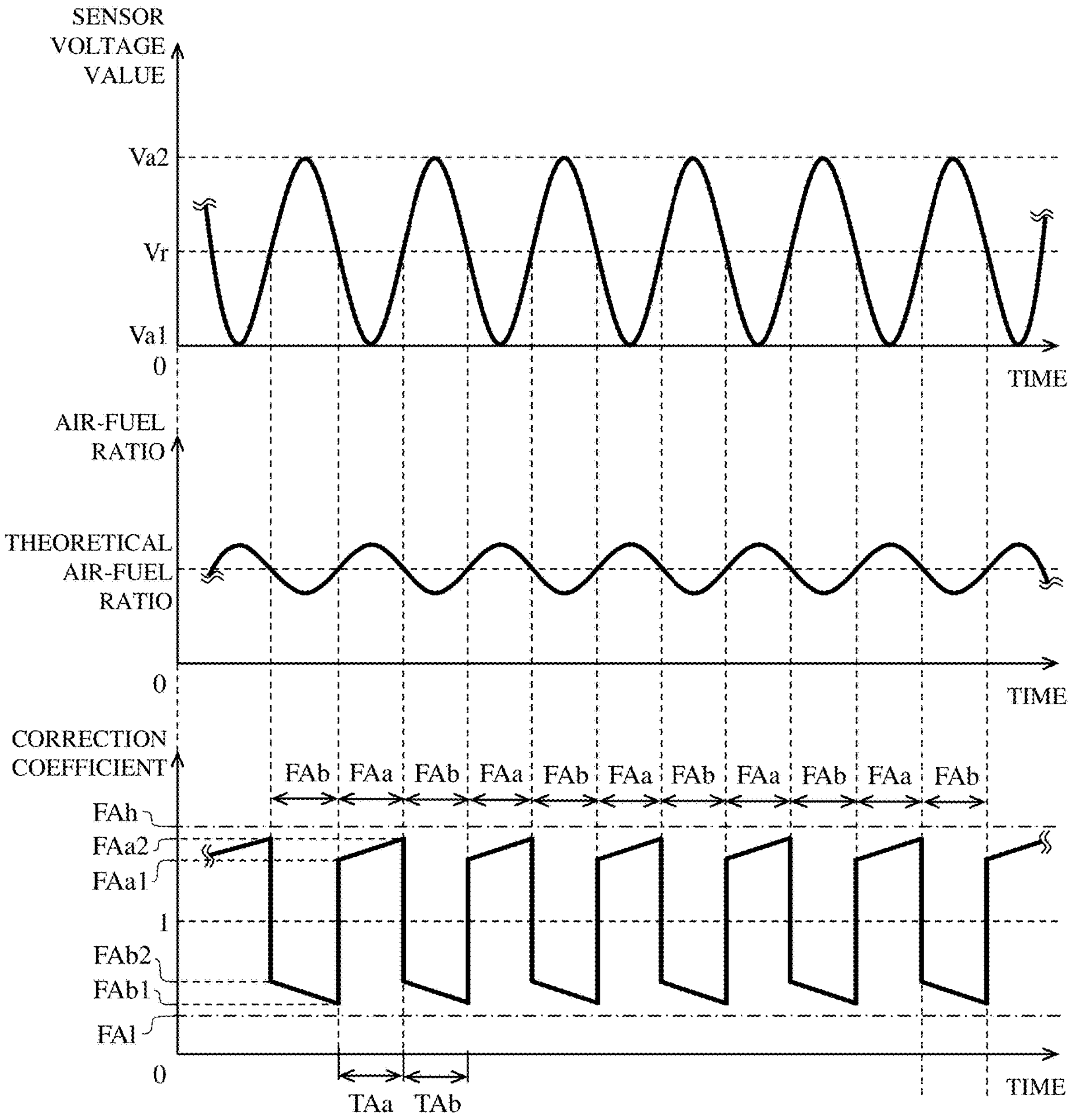
FIG. 3 is a diagram showing one example of temporal behaviors of a detection signal of an air-fuel ratio sensor, an estimated value of an air-fuel ratio, and a correction coefficient of an injection amount of fuel during second feedback control executed when a secondary air control valve is in a closed state.

The second feedback control by the ECU 10 will be described with reference to FIG. 3. FIG. 3 is a diagram showing one example of temporal behaviors of the detection signal of the air-fuel ratio sensor 36, an estimated value of the air-fuel ratio, and a correction coefficient of the injection amount of fuel during the second feedback control when the secondary air control valve 82 is in the closed state.

In the present embodiment, since the air-fuel ratio sensor 36 is the $O_2$ sensor, the voltage value of the air-fuel ratio sensor 36 during the second feedback control shows a first voltage value Va1 and a second voltage value Va2 in accordance with whether or not the exhaust gas contains oxygen. The first voltage value Va1 is smaller than the second voltage value Va2 and corresponds to an air-fuel ratio that is higher than the theoretical air-fuel ratio and is in the lean state. The second voltage value Va2 corresponds to an air-fuel ratio that is lower than the theoretical air-fuel ratio and is in the rich state. A reference voltage value Vr corresponds to the theoretical air-fuel ratio. In the second feedback control, the reference voltage value Vr is an intermediate value between the voltage values Va1 and Va2, and an average value of the voltage values of the air-fuel ratio sensor 36 per predetermined time may be the reference voltage value Vr or a value close to the reference voltage value Vr.

The ECU 10 stores a fuel map in which a reference target injection amount of fuel injected by the fuel injection actuator 40*b*, a rotational frequency of the internal combustion engine 5, and an intake air amount of the internal combustion engine 5 are associated with each other. In the present embodiment, the reference target injection amount is the injection amount of fuel by which the theoretical air-fuel ratio is realized with respect to the intake air amount. However, the reference target injection amount is not limited to this. The injection amount of fuel is an injection amount of fuel per unit time and is represented by, for example, the mass or volume of the fuel injected per minute. The intake air amount corresponds to a target load generated by the internal combustion engine 5. The fuel map is a map for determining the reference target injection amount based on the rotational frequency of the internal combustion engine 5 and the intake air amount of the internal combustion engine 5. The reference target injection amount is one example of a reference fuel supply amount.

The ECU 10 determines the reference target injection amount by applying the rotational frequency of the internal combustion engine 5 and the intake air amount of the internal combustion engine 5 to the fuel map and causes the fuel injection actuator 40*b* to inject the determined reference target injection amount of fuel. The intake air amount may be detected by a sensor, such as an air flow sensor, or may be calculated by the ECU 10 based on the opening degree of the throttle valve.

In the second feedback control, the ECU 10 determines a value of a correction coefficient FA of the injection amount of fuel based on the detection signal of the air-fuel ratio sensor 36 and causes the fuel injection actuator 40*b* to inject the fuel, the amount of which is the injection amount of fuel obtained by multiplying the reference target injection amount by the value of the correction coefficient FA. The correction coefficient FA is a ratio that increases or decreases the reference target injection amount. For example, the value of the correction coefficient FA may be "1," and in this case, the reference target injection amount is not increased or decreased. The value of the correction coefficient FA may be "1.1," and in this case, the injection amount of fuel is obtained by increasing the reference target injection amount by 10%. The value of the correction coefficient FA may be "0.9," and in this case, the injection amount of fuel is obtained by decreasing the reference target injection amount by 10%.

In each of the first feedback control and the second feedback control, the ECU 10 adjusts the correction coefficient with respect to the reference target injection amount based on the detection signal of the air-fuel ratio sensor 36 to adjust the injection amount of fuel supplied to the internal combustion engine 5.

An upper limit restricting value FAh and a lower limit restricting value FAl are preset for the correction coefficient FA of the second feedback control. The value of the correction coefficient FA is determined within a range between the upper limit restricting value FAh and the lower limit restricting value FAl. Moreover, a first correction coefficient FAa and a second correction coefficient FAb are set for the correction coefficient FA.

When the voltage value of the air-fuel ratio sensor 36 is less than the reference voltage value Vr, the ECU 10 uses the first correction coefficient FAa to correct the reference target injection amount. When the voltage value of the air-fuel ratio sensor 36 is greater than the reference voltage value Vr, the ECU 10 uses the second correction coefficient FAb to correct the reference target injection amount. When the voltage value of the air-fuel ratio sensor 36 increases from the first voltage value Va1 to reach the reference voltage value Vr, the ECU 10 switches the correction coefficient to be used from the first correction coefficient FAa to the second correction coefficient FAb. When the voltage value of the air-fuel ratio sensor 36 decreases from the second voltage value Va2 to reach the reference voltage value Vr, the ECU 10 switches the correction coefficient to be used from the second correction coefficient FAb to the first correction coefficient FAa.

The first correction coefficient FAa is a value that is greater than value "1". In the present embodiment, the first correction coefficient FAa may be varied within a range from a lower limit value FAa1 to an upper limit value FAa2. However, the first correction coefficient FAa is not limited to this. The second correction coefficient FAb is a value within a range of less than value "1". In the present embodiment, the second correction coefficient FAb may be varied within a range from a lower limit value FAb1 to an upper limit value FAb2. However, the second correction coefficient FAb is not limited to this. The upper limit value FAa2 of the first correction coefficient FAa is set to a value that is the upper limit restricting value FAh or less. The lower limit value FAb1 of the second correction coefficient FAb is set to a value that is the lower limit restricting value FAl or more.

At a timing at which the voltage value of the air-fuel ratio sensor 36 decreases to reach the reference voltage value Vr, the ECU 10 switches the correction coefficient to be used from the second correction coefficient FAb to the first correction coefficient FAa. Immediately after this, the ECU 10 applies the lower limit value FAa1 to the reference target injection amount to correct the reference target injection amount, and increases the value of the first correction coefficient FAa, applied to the reference target injection amount, to the upper limit value FAa2 with time. In the present embodiment, the ECU 10 increases the value of the first correction coefficient FAa in accordance with a linear function with respect to an elapsed time. However, the ECU 10 may increase the value of the first correction coefficient FAa in accordance with another function. Thus, the air-fuel ratio that is increasing reaches a local maximal value and then decreases to reach the theoretical air-fuel ratio. After that, the voltage value of the air-fuel ratio sensor 36 which is decreasing reaches the first voltage value Va1 and then increases to reach the reference voltage value Vr. For example, a period TAa is required as a period from a time point at which the second correction coefficient FAb is switched to the first correction coefficient FAa to a time point at which the voltage value of the air-fuel ratio sensor 36 reaches the reference voltage value Vr. The upper limit value FAa2 of the first correction coefficient FAa is a restricting value that restricts the upper limit of the correction coefficient FA by which the air-fuel ratio is varied toward the rich state. The upper limit value FAa2 of the first correction coefficient FAa is one example of a third restricting value.

At a timing at which the voltage value of the air-fuel ratio sensor 36 increases to reach the reference voltage value Vr, the ECU 10 switches the correction coefficient to be used from the first correction coefficient FAa to the second correction coefficient FAb. Immediately after this, the ECU 10 applies the upper limit value FAb2 to the reference target injection amount to correct the reference target injection amount, and decreases the value of the second correction coefficient FAb, applied to the reference target injection amount, to the lower limit value FAb1 with time. In the present embodiment, the ECU 10 decreases the value of the second correction coefficient FAb in accordance with a linear function with respect to an elapsed time. However, the ECU 10 may decrease the value of the second correction coefficient FAb in accordance with another function. Thus, the air-fuel ratio that is decreasing reaches a local minimal value and then increases to reach the theoretical air-fuel ratio. After that, the voltage value of the air-fuel ratio sensor 36 which is increasing reaches the second voltage value Va2 and then decreases to reach the reference voltage value Vr. For example, a period TAb is required as a period from a time point at which the first correction coefficient FAa is switched to the second correction coefficient FAb to a time point at which the voltage value of the air-fuel ratio sensor 36 reaches the reference voltage value Vr. In the present example, the period TAb is equivalent to the period TAa. The lower limit value FAb1 of the second correction coefficient FAb is a restricting value that restricts the lower limit of the correction coefficient FA by which the air-fuel ratio is varied toward the lean state. The lower limit value FAb1 of the second correction coefficient FAb is one example of a fourth restricting value.

Since the internal combustion engine 5 is not in the idling state, and the secondary air is not supplied to the exhaust passage 70 of the internal combustion engine 5, the ECU 10 corrects the reference target injection amount while alternately switching the first correction coefficient FAa and the second correction coefficient FAb such that the air-fuel ratio approaches the theoretical air-fuel ratio. Moreover, since the period TAa in which the first correction coefficient FAa is applied to the reference target injection amount and the period TAb in which the second correction coefficient FAb is applied to the reference target injection amount are equivalent to each other, the voltage value of the air-fuel ratio sensor 36 behaves so as to vibrate by alternately varying to the first voltage value Va1 and the second voltage value Va2. Moreover, the average value of the voltage values of the air-fuel ratio sensor 36 per predetermined time may be the reference voltage value Vr or a value close to the reference voltage value Vr. Furthermore, since the value of the correction coefficient FA falls within a range between the upper limit restricting value FAh and the lower limit restricting value FAl, the upper and lower limits of the air-fuel ratio are restricted.

Figure 4:
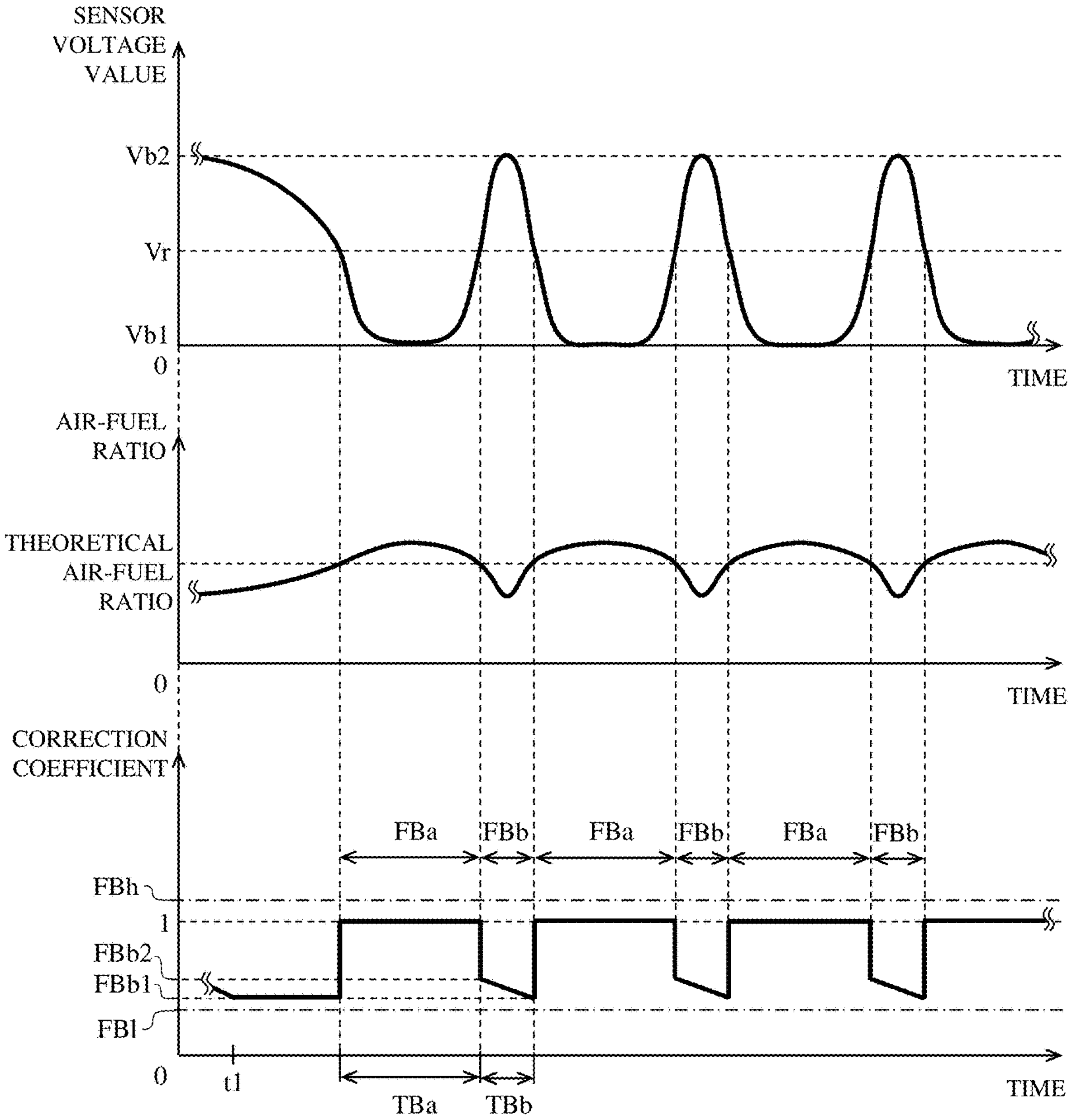
FIG. 4 is a diagram showing one example of temporal behaviors of the detection signal of the air-fuel ratio sensor, the estimated value of the air-fuel ratio, and the correction coefficient of the injection amount of fuel during first feedback control executed when the secondary air control valve is in an open state.

The first feedback control by the ECU 10 will be described with reference to FIG. 4. FIG. 4 is a diagram showing one example of temporal behaviors of the detection signal of the air-fuel ratio sensor 36, the estimated value of the air-fuel ratio, and the correction coefficient of the injection amount of fuel during the first feedback control when the secondary air control valve 82 is in the open state.

In the first feedback control, the ECU 10 determines a value of a correction coefficient FB of the injection amount of fuel based on the detection signal of the air-fuel ratio sensor 36 and causes the fuel injection actuator 40*b* to inject the fuel, the amount of which is the injection amount of fuel obtained by multiplying the reference target injection amount by the value of the correction coefficient FB.

The voltage value of the air-fuel ratio sensor 36 during the first feedback control shows a first voltage value Vb1 and a second voltage value Vb2 in accordance with whether or not the exhaust gas contains oxygen. The first voltage value Vb1 is smaller than the second voltage value Vb2 and corresponds to an air-fuel ratio that is higher than the theoretical air-fuel ratio and is in the lean state. The second voltage value Vb2 corresponds to an air-fuel ratio that is lower than the theoretical air-fuel ratio and is in the rich state. In the first feedback control, the reference voltage value Vr is an intermediate value between the voltage values Vb1 and Vb2, and the average value of the voltage values of the air-fuel ratio sensor 36 is smaller than the reference voltage value Vr. The average value of the voltage values of the air-fuel ratio sensor 36 per predetermined time is 50% or less of the reference voltage value Vr, and may be, for example, within a range of 40% or more and less than 50% of the reference voltage value Vr. Thus, during the first feedback control, the air-fuel ratio behaves so as to be inclined or biased toward the lean state.

In the first feedback control, the ECU 10 determines the value of the correction coefficient FB of the injection amount of fuel based on the detection signal of the air-fuel ratio sensor 36 and causes the fuel injection actuator 40*b* to inject the fuel, the amount of which is the injection amount of fuel obtained by multiplying the reference target injection amount by the value of the correction coefficient FB. An upper limit restricting value FBh and a lower limit restricting value FBl are preset for the correction coefficient FB of the first feedback control. The upper limit restricting value FBh is smaller than the upper limit restricting value FAh of the second feedback control. The lower limit restricting value FBl is larger than the lower limit restricting value FAl of the second feedback control. The value of the correction coefficient FB is determined within a range between the upper limit restricting value FBh and the lower limit restricting value FBl.

Thus, the air-fuel ratio in the first feedback control is controlled such that: a maximum value of the air-fuel ratio of the first feedback control is smaller than a maximum value of the air-fuel ratio of the second feedback control; and a minimum value of the air-fuel ratio of the first feedback control is larger than a minimum value of the air-fuel ratio of the second feedback control. The air-fuel ratio behaves so as to be inclined or biased toward the lean state while being prevented from becoming an excessive lean state. Therefore, even when the internal combustion engine 5 is in the idling state, the internal combustion engine 5 does not stop or stall, and the concentrations of the uncombusted fuel and carbon monoxide in the exhaust gas are reduced.

Moreover, a first correction coefficient FBa and a second correction coefficient FBb are set for the correction coefficient FB. When the voltage value of the air-fuel ratio sensor 36 is less than the reference voltage value Vr, the ECU 10 uses the first correction coefficient FBa to correct the reference target injection amount. In such a case, the air-fuel ratio sensor 36 shows the same detection result as when the air-fuel ratio is in the lean state. Therefore, the concentrations of the uncombusted fuel and carbon monoxide in the exhaust gas to which the secondary air is supplied are low. When the voltage value of the air-fuel ratio sensor 36 is greater than the reference voltage value Vr, the ECU 10 uses the second correction coefficient FBb to correct the reference target injection amount. In such a case, the air-fuel ratio sensor 36 shows the same detection result as when the air-fuel ratio is in the rich state. Therefore, the concentrations of the uncombusted fuel and carbon monoxide in the exhaust gas to which the secondary air is supplied are high. To be specific, the flow rate of the secondary air is inadequate.

When the voltage value of the air-fuel ratio sensor 36 increases from the first voltage value Vb1 to reach the reference voltage value Vr, the ECU 10 changes the correction coefficient to be used from the first correction coefficient FBa to the second correction coefficient FBb. When the voltage value of the air-fuel ratio sensor 36 decreases from the second voltage value Vb2 to reach the reference voltage value Vr, the ECU 10 changes the correction coefficient to be used from the second correction coefficient FBb to the first correction coefficient FBa.

In the present embodiment, the first correction coefficient FBa is set to value "1" or a value close to value "1". However, the first correction coefficient FBa is not limited to this. The first correction coefficient FBa may be greater than value "1" or may be less than value "1". In the present embodiment, the first correction coefficient FBa is constant or substantially constant with time. The first correction coefficient FBa does not vary the injection amount of fuel from the reference target injection amount toward the rich state. The second correction coefficient FBb is a value within a range that is smaller than the first correction coefficient FBa and is less than value "1". In the present embodiment, the second correction coefficient FBb may be varied within a range from an upper limit value FBb2 to a lower limit value FBb1. However, the second correction coefficient FBb is not limited to this. The value of the first correction coefficient FBa is the upper limit restricting value FBh or less. The lower limit value FBb1 of the second correction coefficient FBb is set to a value that is the lower limit restricting value FBl or more.

At a timing at which the voltage value of the air-fuel ratio sensor 36 decreases to reach the reference voltage value Vr, the ECU 10 switches the correction coefficient to be used from the second correction coefficient FBb to the first correction coefficient FBa and applies a set value of the first correction coefficient FBa to the reference target injection amount to correct the reference target injection amount. Thus, the air-fuel ratio that is increasing reaches the local maximal value and then decreases to reach the theoretical air-fuel ratio. Then, the voltage value of the air-fuel ratio sensor 36 which is decreasing reaches the first voltage value Vb1 and then increases to reach the reference voltage value Vr. For example, a period TBa is required as a period from a time point at which the second correction coefficient FBb is switched to the first correction coefficient FBa to a time point at which the voltage value of the air-fuel ratio sensor 36 reaches the reference voltage value Vr. Since the first correction coefficient FBa does not correct the reference target injection amount toward the rich state, the period TBa becomes significantly longer than the period TAa in the second feedback control. The set value of the first correction coefficient FBa is a restricting value that restricts the upper limit of the correction coefficient FB by which the air-fuel ratio is varied toward the rich state. The set value of the first correction coefficient FBa is one example of a first restricting value.

At a timing at which the voltage value of the air-fuel ratio sensor 36 increases to reach the reference voltage value Vr, the ECU 10 switches the correction coefficient to be used from the first correction coefficient FBa to the second correction coefficient FBb. Immediately after this, the ECU 10 applies the upper limit value FBb2 to the reference target injection amount to correct the reference target injection amount, and decreases the value of the second correction coefficient FBb, applied to the reference target injection amount, to the lower limit value FBb1 with time. In the present embodiment, the ECU 10 decreases the value of the second correction coefficient FBb in accordance with a linear function with respect to an elapsed time. However, the ECU 10 may decrease the value of the second correction coefficient FBb in accordance with another function. Thus, the voltage value of the air-fuel ratio sensor 36 which is increasing reaches the second voltage value Vb2 and then decreases to reach the reference voltage value Vr. Then, the air-fuel ratio which is decreasing reaches the local minimal value and then increases to reach the theoretical air-fuel ratio. For example, a period TBb is required as a period from a time point at which the first correction coefficient FBa is switched to the second correction coefficient FBb to a time point at which the voltage value of the air-fuel ratio sensor 36 reaches the reference voltage value Vr. The lower limit value FBb1 of the first correction coefficient FBa is a restricting value that restricts the lower limit of the correction coefficient FB by which the air-fuel ratio is varied toward the lean state. The lower limit value FBb1 of the first correction coefficient FBa is one example of a second restricting value.

Since the first correction coefficient FBa does not correct the reference target injection amount toward the rich state, the behavior of the air-fuel ratio is inclined or biased toward the lean state. Therefore, the period TBb may be significantly shorter than the period TBa and may be shorter than the period TAb in the second feedback control.

The ECU 10 corrects the reference target injection amount while alternately switching the first correction coefficient FBa and the second correction coefficient FBb such that the air-fuel ratio approaches the theoretical air-fuel ratio, and the reference target injection amount does not vary toward the rich state. Since the period TBa in which the first correction coefficient FBa is applied to the reference target injection amount becomes significantly longer than the period TBb in which the second correction coefficient FBb is applied to the reference target injection amount, a period in which the voltage value of the air-fuel ratio sensor 36 is the first voltage value Vb1 becomes long. Therefore, the average value of the voltage values of the air-fuel ratio sensor 36 per predetermined time becomes 50% or less of the reference voltage value Vr, and the behavior of the air-fuel ratio is inclined or biased toward the lean state. Therefore, even when the internal combustion engine 5 is in the idling state, and the secondary air is supplied to the exhaust passage 70 of the internal combustion engine 5, the exhaust gas is purified, and the stop and stall of the internal combustion engine 5 are suppressed.

Moreover, immediately after the start of the internal combustion engine 5 at a time t1 in FIG. 4, the ECU 10 applies the second correction coefficient FBb to the reference target injection amount. Since the injection amount of fuel at the start of the internal combustion engine 5 is larger than the reference target injection amount, and the air-fuel ratio becomes the rich state, the ECU 10 may set the second correction coefficient FBb to the lower limit value FBb1 such that the second correction coefficient FBb is constant or substantially constant with time, and use this second correction coefficient FBb.

Figure 5:
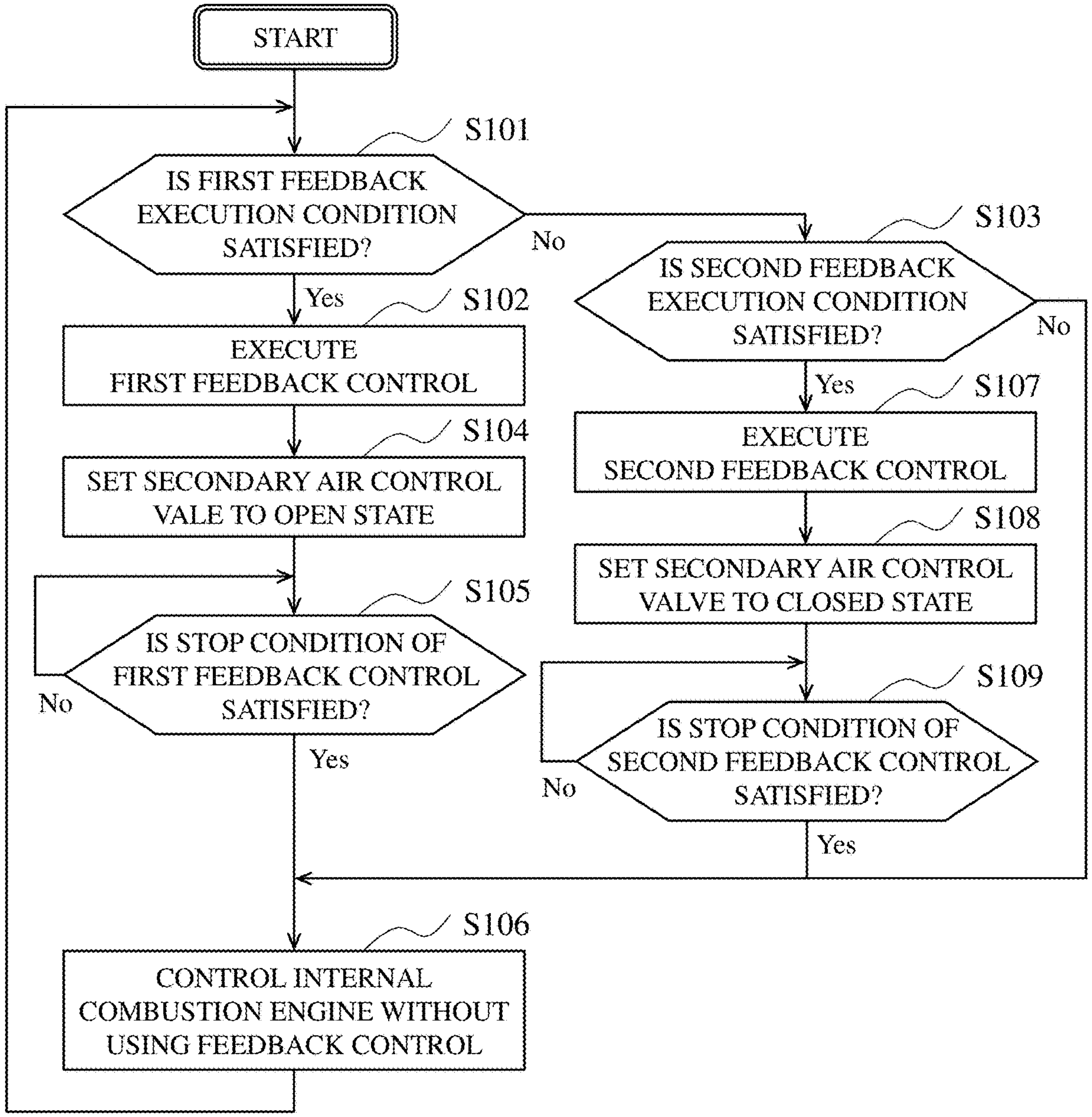
FIG. 5 is a flowchart showing one example of an operation of feedback control of an ECU according to the embodiment.

One example of the operation of the ECU 10 that executes the first feedback control and the second feedback control will be described. FIG. 5 is a flowchart showing one example of the operation of the feedback control of the ECU 10 according to the embodiment.

First, in Step S101, the ECU 10 determines whether or not the first feedback execution condition is satisfied. When the first feedback execution condition is satisfied (Yes in Step S101), the ECU 10 proceeds to Step S102. When the first feedback execution condition is not satisfied (No in Step S101), the ECU 10 proceeds to Step S103. When all of the execution conditions included in the first feedback execution condition are satisfied, the ECU 10 determines that the first feedback execution condition is satisfied. When one or more of the execution conditions included in the first feedback execution condition are not satisfied, the ECU 10 determines that the first feedback execution condition is not satisfied.

In Step S102, the ECU 10 executes the first feedback control. The ECU 10 controls the driving of the fuel injection actuator 40*b* based on the detection signals received from the air-fuel ratio sensor 36.

Next, in Step S104, the ECU 10 causes the secondary air control valve 82 to operate to become the open state. When the secondary air control valve 82 is already in the open state, Step S104 is omitted.

Next, in Step S105, the ECU 10 determines whether or not the stop condition of the first feedback control is satisfied. When the stop condition is satisfied (Yes in Step S105), the ECU 10 proceeds to Step S106. When the stop condition is not satisfied (No in Step S105), the ECU 10 repeats Step S105. When one or more of the conditions included in the stop condition of the first feedback control are satisfied, the ECU 10 determines that the stop condition is satisfied. When the conditions included in the stop condition are not satisfied at all, the ECU 10 determines that the stop condition is not satisfied.

In Step S106, the ECU 10 stops the feedback control that is being executed, and controls the internal combustion engine 5 without using the feedback control. For example, the ECU 10 determines the injection amount of fuel injected to the internal combustion engine 5 in accordance with the fuel map. The ECU 10 performs the determination of Step S101 during the execution of Step S106.

In Step S103, the ECU 10 determines whether or not the second feedback execution condition is satisfied. When the second feedback execution condition is satisfied (Yes in Step S103), the ECU 10 proceeds to Step S107. When the second feedback execution condition is not satisfied (No in Step S103), the ECU 10 proceeds to Step S106.

When all of the execution conditions included in the second feedback execution condition are satisfied, the ECU 10 determines that the second feedback execution condition is satisfied. When one or more of the execution conditions included in the second feedback execution condition are not satisfied, the ECU 10 determines that the second feedback execution condition is not satisfied.

In Step S107, the ECU 10 executes the second feedback control. The ECU 10 controls the driving of the fuel injection actuator 40*b* based on the detection signals received from the air-fuel ratio sensor 36.

Next, in Step S108, the ECU 10 causes the secondary air control valve 82 to operate to become the closed state. When the secondary air control valve 82 is already in the closed state, Step S108 is omitted.

Next, in Step S109, the ECU 10 determines whether or not the stop condition of the second feedback control is satisfied. When the stop condition is satisfied (Yes in Step S109), the ECU 10 proceeds to Step S106. When the stop condition is not satisfied (No in Step S109), the ECU 10 repeats Step S109. When one or more of the conditions included in the stop condition of the second feedback control are satisfied, the ECU 10 determines that the stop condition is satisfied. When the conditions included in the stop condition are not satisfied at all, the ECU 10 determines that the stop condition is not satisfied.

In Steps S101 to S109, the ECU 10 selects and executes the first feedback control or the second feedback control in accordance with the vehicle state of the motorcycle 1. The ECU 10 executes the determination of Step S101 and then executes the determination of Step S103. However, the order of these determinations may be reversed. The ECU 10 may execute Step S102 after Step S104. The ECU 10 may execute Step S107 after Step S108.

Others

The foregoing has described the exemplary embodiment of the present disclosure. However, the present disclosure is not limited to the above embodiment. To be specific, various modifications and improvements may be made within the scope of the present disclosure. For example, embodiments prepared by variously modifying the embodiment and embodiments prepared by combining components in different embodiments are also included in the scope of the present disclosure.

For example, in the embodiment, the ECU 10 causes the secondary air control valve 82 to operate to become the open state after the start of the first feedback control and causes the secondary air control valve 82 to operate to become the closed state after the start of the second feedback control. However, the control of the ECU 10 is not limited to this. For example, the ECU 10 may start the first feedback control after causing the secondary air control valve 82 to operate to become the open state. The ECU 10 may start the second feedback control after causing the secondary air control valve 82 to operate to become the closed state. In such cases, the first feedback execution condition may include a condition that the secondary air control valve 82 is in the open state. The second feedback execution condition may include a condition that the secondary air control valve 82 is in the closed state.

In the embodiment, the open drive condition of the secondary air control valve 82 includes a condition that the first feedback execution condition is satisfied, and the close drive condition of the secondary air control valve 82 includes a condition that the second feedback execution condition is satisfied. However, the drive condition are not limited to these. The execution conditions included in the open drive condition and the execution conditions included in the first feedback execution condition may be different from each other. For example, the number of execution conditions included in the open drive condition may be large or smaller than the number of execution conditions included in the first feedback execution condition. The execution conditions included in the close drive condition and the execution conditions included in the second feedback execution condition may be different from each other. For example, the number of execution conditions included in the close drive condition may be larger or smaller than the number of execution conditions included in the second feedback execution condition.

In the embodiment, in the second feedback control, the ECU 10 increases the value of the first correction coefficient FAa with time and decreases the value of the second correction coefficient FAb with time. However, the control of the ECU 10 is not limited to this. For example, the ECU 10 may decrease the value of the first correction coefficient FAa with time or may maintain the value of the first correction coefficient FAa constant or substantially constant with time. The ECU 10 may increase the value of the second correction coefficient FAb with time or may maintain the value of the second correction coefficient FAb constant or substantially constant with time. The ECU 10 may control the value of the first correction coefficient FAa such that an integrated value of the value of the first correction coefficient FAa in each period TAa becomes a constant value. The ECU 10 may control the value of the second correction coefficient FAb such that an integrated value of the value of the second correction coefficient FAb in each period TAb becomes a constant value.

In the embodiment, in the first feedback control, the ECU 10 maintains the value of the first correction coefficient FBa constant or substantially constant with time and decreases the value of the second correction coefficient FBb with time. However, the control of the ECU 10 is not limited to this. For example, the ECU 10 may increase or decrease the value of the first correction coefficient FBa with time. The ECU 10 may increase the value of the second correction coefficient FBb with time or may maintain the value of the second correction coefficient FBb constant or substantially constant with time. The ECU 10 may control the value of the first correction coefficient FBa such that an integrated value of the value of the first correction coefficient FBa in each period TBa becomes a constant value. The ECU 10 may control the value of the second correction coefficient FBb such that an integrated value of the value of the second correction coefficient FBb in each period TBb becomes a constant value.

In the embodiment, in the second feedback control, at a timing at which the voltage value of the air-fuel ratio sensor 36 increases or decreases to reach the reference voltage value Vr, the ECU 10 switches the correction coefficient to be used between the first correction coefficient FAa and the second correction coefficient FAb. However, the control of the ECU 10 is not limited to this. A switching timing at which the correction coefficient to be used is switched between the first correction coefficient FAa and the second correction coefficient FAb may be a timing before the voltage value of the air-fuel ratio sensor 36 reaches the reference voltage value Vr. For example, the switching timing may be any timing in a period from a timing at which the voltage value of the air-fuel ratio sensor 36 which is increasing starts decreasing to a timing at which the voltage value of the air-fuel ratio sensor 36 reaches the reference voltage value Vr. The switching timing may be any timing in a period from a timing at which the voltage value of the air-fuel ratio sensor 36 which is decreasing starts increasing to a timing at which the voltage value of the air-fuel ratio sensor 36 reaches the reference voltage value Vr.

In the embodiment, in the first feedback control, at a timing at which the voltage value of the air-fuel ratio sensor 36 increases or decreases to reach the reference voltage value Vr, the ECU 10 switches the correction coefficient to be used between the first correction coefficient FBa and the second correction coefficient FBb. However, the control of the ECU 10 is not limited to this. The switching timing at which the correction coefficient to be used is switched between the first correction coefficient FBa and the second correction coefficient FBb may be a timing before the voltage value of the air-fuel ratio sensor 36 reaches the reference voltage value Vr. For example, the switching timing may be any timing in a period from a timing at which the voltage value of the air-fuel ratio sensor 36 which is increasing starts decreasing to a timing at which the voltage value of the air-fuel ratio sensor 36 reaches the reference voltage value Vr. The switching timing may be any timing in a period from a timing at which the voltage value of the air-fuel ratio sensor 36 which is decreasing starts increasing to a timing at which the voltage value of the air-fuel ratio sensor 36 reaches the reference voltage value Vr.

In the embodiment, the first feedback control and the second feedback control by the ECU 10 when the air-fuel ratio sensor 36 is the $O_2$ sensor are described. However, even when the air-fuel ratio sensor 36 is a sensor other than the $O_2$ sensor, the ECU 10 can perform the first feedback control and the second feedback control in the same manner. In the embodiment, the ECU 10 determines the correction coefficient to be used in accordance with whether the air-fuel ratio corresponding to the voltage value of the $O_2$ sensor is in a state of reaching the theoretical air-fuel ratio from the lean state, a state of reaching the theoretical air-fuel ratio from the rich state, a state of changing from an increasing state to a decreasing state, or a state of changing from the decreasing state to the increasing state, and then the ECU 10 adjusts and uses the determined correction coefficient. Even when the air-fuel ratio sensor is a sensor other than the $O_2$ sensor, the ECU 10 may determine the correction coefficient to be used in accordance with whether the air-fuel ratio corresponding to the detection signal of the air-fuel ratio sensor is in a state of reaching the theoretical air-fuel ratio from the lean state, a state of reaching the theoretical air-fuel ratio from the rich state, a state of changing from the increasing state to the decreasing state, or a state of changing from the decreasing state to the increasing state, and then the ECU 10 may adjust and use the determined correction coefficient.

Examples of aspects of the technology of the present disclosure will be described below. Control circuitry according to a first aspect of the present disclosure is control circuitry of an internal combustion engine of a vehicle, the control circuitry being configured to: determine whether or not a first condition is satisfied, the first condition being a condition that the internal combustion engine is in an idling state; determine whether or not a second condition is satisfied, the second condition being a condition that the internal combustion engine is in a state where air which has bypassed the internal combustion engine is supplied to an exhaust passage of the internal combustion engine; acquire air-fuel ratio information that is information regarding an air-fuel ratio detected by an air-fuel ratio sensor from an exhaust gas of the internal combustion engine; and as a result of determining that the first condition and the second condition are satisfied, execute first feedback control in which an amount of fuel supplied to the internal combustion engine is increased or decreased based on the air-fuel ratio information in response to an increase or decrease of the air-fuel ratio.

According to the first aspect, the control circuitry executes the first feedback control when the first condition and the second condition are satisfied, i.e., in response to the control circuitry determining that the first condition and the second condition are satisfied. Therefore, the internal combustion engine is subjected to the first feedback control under a condition where the internal combustion engine is supplied with the secondary air and is in the idling state. In the first feedback control, the control circuitry adjusts the amount of fuel supplied to the internal combustion engine such that the amount of fuel supplied to the internal combustion engine responds to the increase or decrease of the air-fuel ratio of the exhaust gas containing the secondary air. Therefore, the control circuitry can stabilize the state of the exhaust gas discharged from the internal combustion engine.

The control circuitry according to a second aspect of the present disclosure may be configured such that: in the first aspect, the control circuitry is further configured to determine whether or not a third condition is satisfied, the third condition being a condition that a transmission included in the vehicle is in a neutral gear state in which gears of the transmission are not connected to the internal combustion engine so as to transmit driving power of the internal combustion engine; and the control circuitry executes the first feedback control as a result of determining that the third condition is satisfied in addition to the first condition and the second condition.

According to the second aspect, the control circuitry executes the first feedback control when the third condition is satisfied in addition to the first condition and the second condition, i.e., in response to the control circuitry determining that the third condition is satisfied in addition to the first condition and the second condition. Thus, the vehicle state for executing the first feedback control is limited to a state where a load acting on the internal combustion engine is low. In such a state, the control circuitry can stabilize the state of the exhaust gas discharged from the internal combustion engine.

The control circuitry according to a third aspect of the present disclosure may be configured such that: in the first or second aspect, the control circuitry is further configured to as a result of determining that the second condition is not satisfied, execute second feedback control in which the amount of fuel supplied to the internal combustion engine is increased or decreased based on the air-fuel ratio information in response to the increase or decrease of the air-fuel ratio, the second feedback control being executed in accordance with a restriction of the air-fuel ratio which is different from the first feedback control and determine whether or not a fourth condition is satisfied, the fourth condition being a condition that the second feedback control is not being executed; and the control circuitry executes the first feedback control as a result of determining that the fourth condition is satisfied in addition to the first condition and the second condition.

According to the third aspect, the control circuitry executes the second feedback control when the second condition is not satisfied, i.e., in response to the control circuitry determining that the second condition is not satisfied. The control circuitry executes the first feedback control when the fourth condition is satisfied in addition to the first condition and the second condition, i.e., in response to the control circuitry determining that the fourth condition is satisfied in addition to the first condition and the second condition. Therefore, the execution of the first feedback control is limited to when the second feedback control is not being executed. Thus, the first feedback control is executed as the control which: corresponds to the internal combustion engine under the condition where the internal combustion engine is being supplied with the secondary air and is in the idling state; and is different from the second feedback control.

The control circuitry according to a fourth aspect of the present disclosure may be configured such that: in any one of the first to third aspects, the control circuitry is further configured to, as a result of determining that the second condition is not satisfied, execute second feedback control in which the amount of fuel supplied to the internal combustion engine is increased or decreased based on the air-fuel ratio information in response to the increase or decrease of the air-fuel ratio, and the amount of fuel supplied to the internal combustion engine is adjusted so as to fall within a range between a third restricting value and a fourth restricting value, the third restricting value being a value that restricts an upper limit of the amount of fuel supplied by which the air-fuel ratio is varied toward a rich state, the fourth restricting value being a value that restricts a lower limit of the amount of fuel supplied by which the air-fuel ratio is varied toward a lean state; in the first feedback control, the control circuitry adjusts the amount of fuel supplied to the internal combustion engine such that the amount of fuel supplied to the internal combustion engine falls within a range between a first restricting value and a second restricting value, the first restricting value being a value that restricts an upper limit of the amount of fuel supplied by which the air-fuel ratio is varied toward the rich state, the second restricting value being a value that restricts a lower limit of the amount of fuel supplied by which the air-fuel ratio is varied toward the lean state; and the first restricting value is smaller than the third restricting value, or the second restricting value is larger than the fourth restricting value.

According to the fourth aspect, when the second condition is not satisfied, i.e., in response to the control circuitry determining that the second condition is not satisfied, the control circuitry executes the second feedback control in which the amount of fuel supplied to the internal combustion engine is adjusted so as to fall within a range between the third restricting value and the fourth restricting value. In the first feedback control, the control circuitry adjusts the amount of fuel supplied to the internal combustion engine such that the amount of fuel supplied to the internal combustion engine falls within a range between the first restricting value smaller than the third restricting value and the second restricting value larger than the fourth restricting value. Thus, the difference between the first feedback control and the second feedback control is made clear. The first feedback control can prevent the air-fuel ratio from changing to a richer side than the second feedback control. Therefore, the concentrations of the uncombusted fuel and carbon monoxide in the exhaust gas can be reduced. The first feedback control can prevent the air-fuel ratio from changing to a leaner side than the second feedback control. Therefore, the unstable behavior of the internal combustion engine, such as the stall in the idling state, can be prevented.

The control circuitry according to a fifth aspect of the present disclosure may be configured such that in the fourth aspect, the first restricting value is a restricting value of the amount of fuel supplied that corresponds to a theoretical air-fuel ratio or an air-fuel ratio that is leaner than the theoretical air-fuel ratio.

According to the fifth aspect, the first feedback control can prevent the air-fuel ratio from changing to the rich side.

The control circuitry according to a sixth aspect of the present disclosure may be configured such that: in any one of the first to fifth aspects, in the first feedback control, as a result of the control circuitry detecting based on the air-fuel ratio information a first state in which the air-fuel ratio is varied toward a rich state, the control circuitry decreases the amount of fuel supplied to the internal combustion engine, and as a result of the control circuitry detecting based on the air-fuel ratio information a second state in which the air-fuel ratio is varied toward a lean state, the control circuitry increases the amount of fuel supplied to the internal combustion engine.

According to the sixth aspect, the first feedback control increases or decreases the amount of fuel supplied in accordance with the variation of the air-fuel ratio toward the lean state or the rich state. Therefore, the robustness of the air-fuel ratio for the exhaust gas containing the secondary air improves.

The control circuitry according to a seventh aspect of the present disclosure may be configured such that in the sixth aspect, in the first state in the first feedback control, the control circuitry adjusts the amount of fuel supplied to the internal combustion engine such that the amount of fuel supplied to the internal combustion engine is maintained constant.

According to the seventh aspect, the first feedback control can effectively prevent the air-fuel ratio from becoming the rich state.

The control circuitry according to an eighth aspect of the present disclosure may be configured such that in any one of the first to seventh aspects, that the amount of fuel supplied is increased, decreased, or maintained constant denotes that a correction coefficient is increased, decreased, or maintained constant, the correction coefficient being a ratio by which a reference fuel supply amount corresponding to a theoretical air-fuel ratio is increased or decreased.

According to the eighth aspect, the control circuitry can execute the feedback control in response to a change in the state of the internal combustion engine, such as a change in the rotational frequency.

A motorcycle according to a ninth aspect of the present disclosure includes: the control circuitry according to any one of the first to eighth aspects; the internal combustion engine; a secondary air supply structure including a supply passage that connects an intake passage and the exhaust passage, the intake passage being a passage through which air is introduced to the internal combustion engine, the exhaust passage being a passage through which the exhaust gas from the internal combustion engine is led out and a valve that opens and closes the supply passage; and the air-fuel ratio sensor located at a portion of the exhaust passage which is located downstream of the supply passage in a flow direction of the exhaust gas, wherein the control circuitry determines based on an open/closed state of the valve whether or not the second condition is satisfied.

According to the ninth aspect, the same effects as the control circuitry according to the aspects of the present disclosure can be obtained.

The functionality of the elements disclosed herein may be implemented using circuitry or processing circuitry which includes general purpose processors, special purpose processors, integrated circuits, ASICs, conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

All of the numerals used herein, such as the ordinal numbers and those indicating quantities, are examples used to specifically describe the technology of the present disclosure, and the present disclosure is not limited to those example numerals. Connection relationships among the components herein are mere examples to specifically describe the technology of the present disclosure, and connection relationships that realize the functions of the present disclosure are not limited to these examples.

As the present disclosure may be embodied in various forms without departing from the scope of the essential features thereof, the illustrative embodiment and variations are therefore illustrative and not restrictive, since the scope of the present disclosure is defined by the appended claims rather than by the description preceding them. All changes that fall within metes and bounds of the claims, or equivalence of such metes and bounds thereof are therefore intended to be embraced by the claims.

The invention claimed is:

1. Control circuitry of an internal combustion engine of a vehicle, the control circuitry being configured to:

determine whether or not a first condition is satisfied, the first condition being a condition that the internal combustion engine is in an idling state;

determine whether or not a second condition is satisfied, the second condition being a condition that the internal combustion engine is in a state where air which has bypassed the internal combustion engine is supplied to an exhaust passage of the internal combustion engine;

acquire air-fuel ratio information that is information regarding an air-fuel ratio detected by an air-fuel ratio sensor from an exhaust gas of the internal combustion engine; and as a result of determining that the first condition and the second condition are satisfied, execute first feedback control in which an amount of fuel supplied to the internal combustion engine is increased or decreased based on the air-fuel ratio information in response to an increase or decrease of the air-fuel ratio.

2. The control circuitry according to claim 1, wherein:

the control circuitry is further configured to determine whether or not a third condition is satisfied, the third condition being a condition that a transmission included in the vehicle is in a neutral gear state in which gears of the transmission are not connected to the internal combustion engine so as to transmit driving power of the internal combustion engine; and the control circuitry executes the first feedback control as a result of determining that the third condition is satisfied in addition to the first condition and the second condition.

3. The control circuitry according to claim 1, wherein:

the control circuitry is further configured to as a result of determining that the second condition is not satisfied, execute second feedback control in which the amount of fuel supplied to the internal combustion engine is increased or decreased based on the air-fuel ratio information in response to the increase or decrease of the air-fuel ratio, the second feedback control being executed in accordance with a restriction of the air-fuel ratio which is different from the first feedback control and determine whether or not a fourth condition is satisfied, the fourth condition being a condition that the second feedback control is not being executed; and the control circuitry executes the first feedback control as a result of determining that the fourth condition is satisfied in addition to the first condition and the second condition.

4. The control circuitry according to claim 1, wherein:

the control circuitry is further configured to, as a result of determining that the second condition is not satisfied, execute second feedback control in which the amount of fuel supplied to the internal combustion engine is increased or decreased based on the air-fuel ratio information in response to the increase or decrease of the air-fuel ratio, and the amount of fuel supplied to the internal combustion engine is adjusted so as to fall within a range between a third restricting value and a fourth restricting value, the third restricting value being a value that restricts an upper limit of the amount of fuel supplied by which the air-fuel ratio is varied toward a rich state, the fourth restricting value being a value that restricts a lower limit of the amount of fuel supplied by which the air-fuel ratio is varied toward a lean state;

in the first feedback control, the control circuitry adjusts the amount of fuel supplied to the internal combustion engine such that the amount of fuel supplied to the internal combustion engine falls within a range between a first restricting value and a second restricting value, the first restricting value being a value that restricts an upper limit of the amount of fuel supplied by which the air-fuel ratio is varied toward the rich state, the second restricting value being a value that restricts a lower limit of the amount of fuel supplied by which the air-fuel ratio is varied toward the lean state; and the first restricting value is smaller than the third restricting value, or the second restricting value is larger than the fourth restricting value.

5. The control circuitry according to claim 4, wherein:

the first restricting value is a restricting value of the amount of fuel supplied that corresponds to a theoretical air-fuel ratio or an air-fuel ratio that is leaner than the theoretical air-fuel ratio.

6. The control circuitry according to claim 1, wherein:

in the first feedback control, as a result of the control circuitry detecting based on the air-fuel ratio information a first state in which the air-fuel ratio is varied toward a rich state, the control circuitry decreases the amount of fuel supplied to the internal combustion engine, and as a result of the control circuitry detecting based on the air-fuel ratio information a second state in which the air-fuel ratio is varied toward a lean state, the control circuitry increases the amount of fuel supplied to the internal combustion engine.

7. The control circuitry according to claim 6, wherein in the first state in the first feedback control, the control circuitry adjusts the amount of fuel supplied to the internal combustion engine such that the amount of fuel supplied to the internal combustion engine is maintained constant.

8. The control circuitry according to claim 1, wherein that the amount of fuel supplied is increased, decreased, or maintained constant denotes that a correction coefficient is increased, decreased, or maintained constant, the correction coefficient being a ratio by which a reference fuel supply amount corresponding to a theoretical air-fuel ratio is increased or decreased.

9. A motorcycle comprising:

the control circuitry according to claim 1;

the internal combustion engine;

a secondary air supply structure including a supply passage that connects an intake passage and the exhaust passage, the intake passage being a passage through which air is introduced to the internal combustion engine, the exhaust passage being a passage through which the exhaust gas from the internal combustion engine is led out and a valve that opens and closes the supply passage; and the air-fuel ratio sensor located at a portion of the exhaust passage which is located downstream of the supply passage in a flow direction of the exhaust gas, wherein the control circuitry determines based on an open/closed state of the valve whether or not the second condition is satisfied.

* * * * *